United States Patent [19]

Gniewek et al.

[11] 4,395,679

[45] Jul. 26, 1983

[54] SINGLE SENSOR ENGINE ANALYZER WITH NOISE REJECTION AND AUTOMATIC TRIGGERING CIRCUIT

[75] Inventors: Stephen A. Gniewek, Glendora; Dick M. Olsen, Pasadena, both of Calif.

[73] Assignee: Clayton Manufacturing Company, El Monte, Calif.

[21] Appl. No.: 204,476

[22] Filed: Nov. 6, 1980

Related U.S. Application Data

[62] Division of Ser. No. 14,807, Feb. 26, 1979, which is a division of Ser. No. 854,768, Nov. 25, 1977.

[51] Int. Cl.³ .................................................. F02P 17/00
[52] U.S. Cl. ..................................... 324/379; 324/384
[58] Field of Search ............... 324/378, 379, 384, 391, 324/392

[56] References Cited

U.S. PATENT DOCUMENTS 3,187,201  6/1965  Eastman et al. .................. 307/273

*Primary Examiner*—Ernest F. Karlsen
*Attorney, Agent, or Firm*—Jackson, Jones & Price

[57] ABSTRACT

An internal combustion engine analyzer is described which permits analysis to be performed by attaching one sensor to the engine circuit. Timing at idle, engine speed, plug firing parade, etc., can be performed with only one sensor connected to the engine. For more extensive testing wherein additional leads are used, for example, at both the primary and secondary of the engine ignition coil, circuitry is provided for automatically triggering from both primary and secondary input signals or either one if only one is present. The analyzer also contains circuitry that enhances its use with both standard and electronic ignition systems. This circuitry rejects the noise generated by ignition systems in the cylinder ignition signals representative of plug firing so as not to mistrigger, or fire more than once for each plug firing.

5 Claims, 10 Drawing Figures

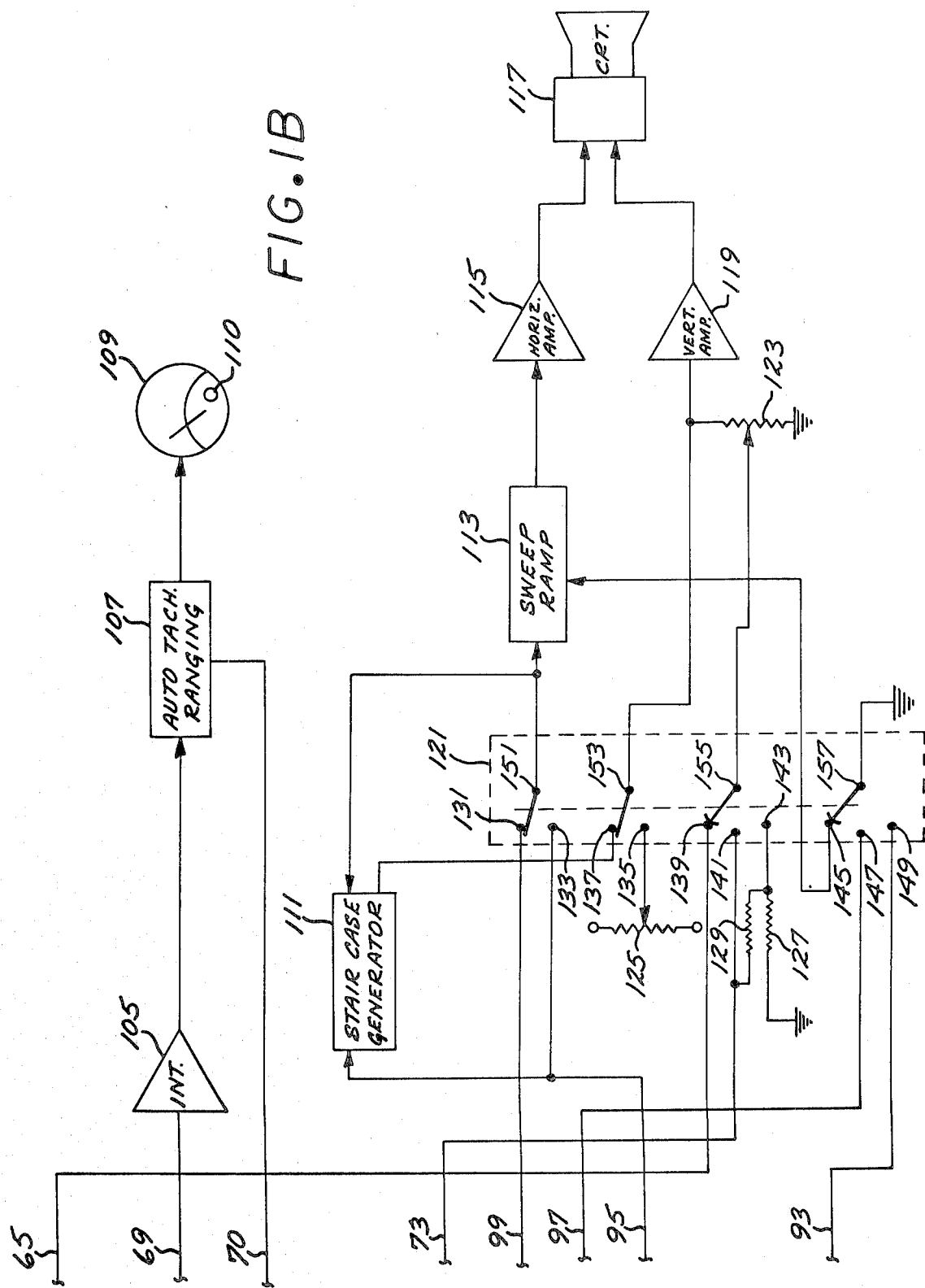

SINGLE SENSOR ENGINE ANALYZER WITH NOISE REJECTION AND AUTOMATIC TRIGGERING CIRCUIT

CROSS REFERENCE TO RELATED APPLICATIONS

This is a division of application Ser. No. 14,807, filed Feb. 26, 1979, which is a division of application Ser. No. 854,768 filed Nov. 25, 1977 for SINGLE SENSOR ENGINE ANALYZER WITH NOISE REJECTION AND AUTOMATIC TRIGGERING CIRCUIT.

BACKGROUND OF THE INVENTION

1. Field of the Invention

The present invention relates generally to improvements in analyzing systems for internal combustion engines and, more particularly, pertains to a new and improved electronic testing system for analyzing certain engine operating characteristics.

2. Description of the Prior Art

With the advent of solid state integrated circuitry, numerous electronic analyzers have been proposed and are being utilized to indicate various performance characteristics of the internal combustion engines used in today's automobile. Of particular importance is the use of such electronic analyzers to ascertain the performance of the ignition system. Such electronic analyzers typically utilize a timing light, a cathode ray tube display of the test data and various probes and connecting cables for connecting the electrical system of the engine to the analyzer. Typically five probes and connecting cables are utilized; a primary probe for connection to the primary of the engine ignition coil; a secondary probe for connection to the secondary of the engine ignition coil; a number one cylinder probe for connection to the number one cylinder plug; a battery probe for connection to the positive terminal of the battery; and, a ground probe for connection to the engine ground.

By use of all of these probes, the prior art analyzer systems can provide a fairly complete picture of the performance of the internal combustion engine. However, the prior art analyzers require the operator to follow a rigid, inflexible procedure that does not permit him to perform a fast and easy test. The capability of performing a fast and easy test sequence on an internal combustion engine is highly desirable to the user of such equipment interested in providing his customer with the fastest, best and least expensive service possible. Because prior art electronic analyzers are incapable of providing the user with this highly desired and needed capability, the use of such equipment has not been as widely employed in diagnostic and service shops as might be expected.

OBJECTS AND SUMMARY OF THE INVENTION

It is an object of the present invention to provide an engine analyzer that need be connected to the engine by only one sensor lead.

It is a further object of the present invention to provide for automatic triggering from either the primary or secondary sensors of the ignition coil or either one when only one sensor is connected.

It is yet another object of this invention to provide noise rejection triggering circuitry that will respond equally well without mistriggering to standard and electronic ignition systems.

These objects and the general purpose of this invention are provided as follows: A frequency sensing noise rejection circuit responds to plug firing signals from either standard or electronic ignition signals by triggering upon the sensing of a change at its input and generating a signal that will block further triggering for substantially the remaining portion of the firing cycle. The blocking interval depends on the frequency of the plug firing signal. A circuit is provided for automatically sensing the firing signals at the primary and secondary of the engine ignition coil, or either one if only one sensor is connected. A timing light is fired each time a plug fires rather than at each firing of the number one plug up to a maximum of predetermined revolutions per minutes of the engine and then is shot off automatically. A self-starting ring counter which does not require a resetting signal such as the number one plug firing signal is utilized to generate timing signals for a CRT display and the timing light.

BRIEF DESCRIPTION OF THE DRAWINGS

The exact nature of this invention, as well as other objects and advantages thereof, will be readily apparent upon consideration of the following specification in relation to the annexed drawings, in which like reference numerals designate like parts of the figures thereof, and wherein:

FIGS. 1A and 1B are a block diagram of an engine analyzer apparatus in accordance with the present invention.

DESCRIPTION OF THE PREFERRED EMBODIMENT

The present internal combustion engine performance analyzing apparatus is an improvement over the engine ignition and power analyzer described and patented in U.S. Pat. No. 3,650,149 issued on Mar. 21, 1972, and assigned to the same assignee as is the present invention. The disclosure of U.S. Pat. No. 3,650,149 is hereby incorporated in total within this application to the extent that descriptions of components used in the system description of the present application can be found therein.

Figure 1A:
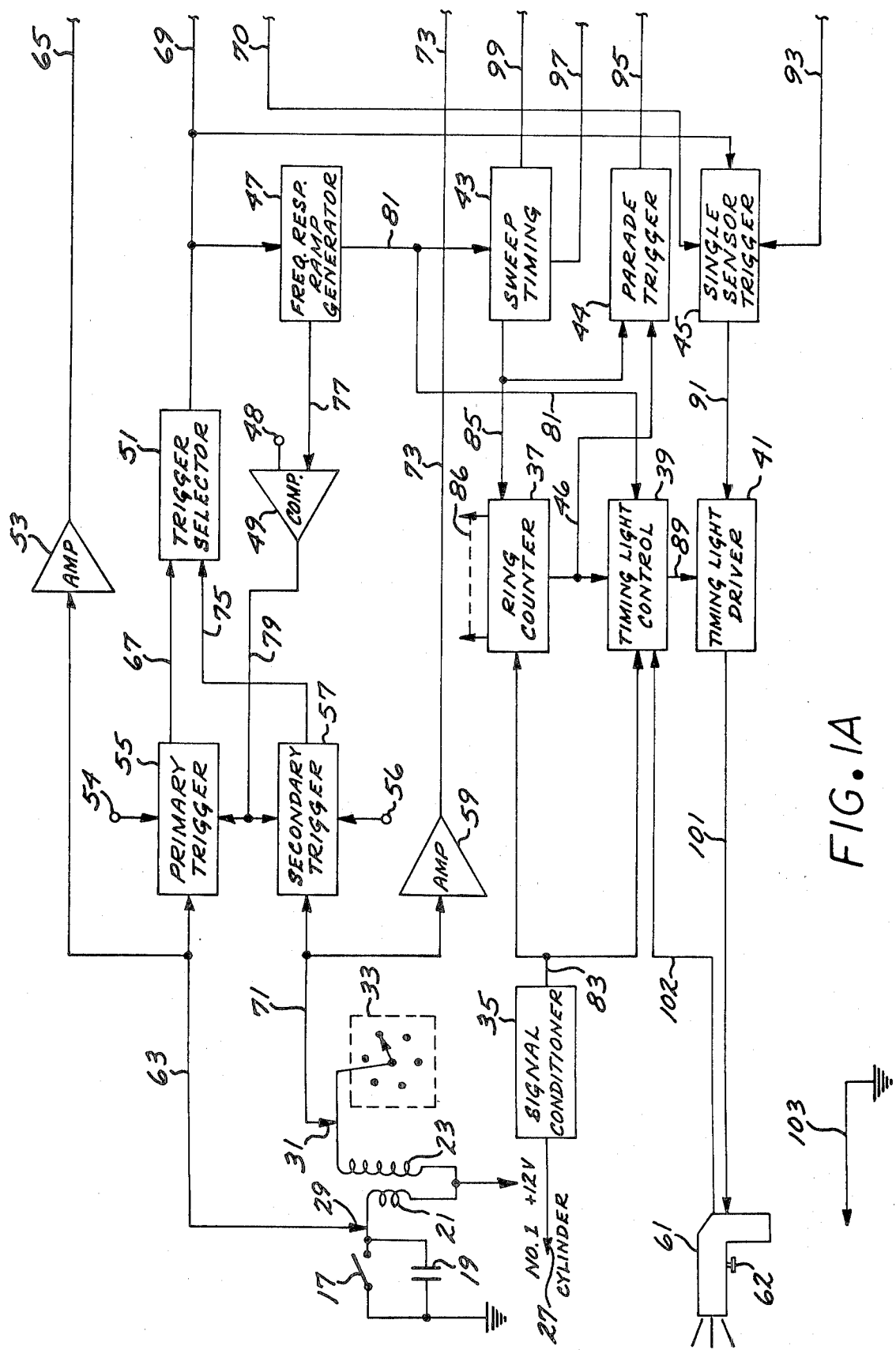

Referring first to the block diagrams of FIGS. 1A and 1B, the apparatus of the present invention is shown as having four probes 29, 31, 27 and 103 for connection to the engine under test. That is, a primary connecting probe 29, a secondary connecting probe 31, a number 1 cylinder connecting probe 27, and a ground connecting probe 103. In addition, the analyzing apparatus of the present invention drives a timing light 61.

The primary winding 21 of the engine's ignition coil is typically connected between a switch or "breaker points" 17 and the positive terminal 25 of the engine's battery, which is typically 12 volts. A capacitor 19 is shunted across the points 17 of the engine. The other side of the points 17 are connected to engine ground. The secondary winding 23 of the engine's ignition coil is connected to an arm 24 of the engine's distributor 33.

The signals picked up by secondary probe 31 are utilized to cause cylinder ignition. These signals are suitably attenuated by a voltage dividing network (not shown), for example, which reduces the high voltage ignition pulses appearing on distributor arm 24 to a relatively low value, compatible with the input circuitry of the analyzer. Reference may be had to U.S. Pat. No. 3,650,149 for a description of a voltage dividing network which may be utilized for this purpose.

The signals picked up by the primary probe 21 are representative of cylinder ignition. These signals are supplied by lead 63 to a primary trigger circuit 55, and an amplifier 53. The amplifier 53 amplifies the signals and supplies them over line 65 to contact 139 of selector switch 121 (FIG. 1B). The selector switch 121 connects these signals through variable resistor 123 to the vertical amplifier 119 of the deflection coils 117 of cathode ray tube (CRT) device. The amplitude of the display of this signal is adjusted by variable resistor 123.

The primary trigger circuit 55 also receives a reference voltage at terminal 54 besides the primary plug firing signals on line 63. The trigger circuit preferably is a combination of a comparator and one-shot multivibrator (not shown). The comparator compares the signals on line 63 with the voltage level supplied to reference input terminal 54, and generates an output signal whenever the reference level is exceeded. This output signal is supplied to the one-shot multivibrator which triggers to produce a short timing control pulse on output line 67. Therefor, each time the input signal on line 63 exceeds the reference voltage level at terminal 54, a short timing control pulse on line 67 is supplied to trigger selector circuit 51.

Trigger selector circuit 51 preferably is a serial combination of an OR gate (not shown), receiving the signal on line 67, and supplying its output to a non-retriggerable one-shot multivibrator (not shown). The other input to the OR gate is the signal on line 75 from a secondary trigger circuit 75. The output of the trigger selector circuit 51 on line 69 is a series of short timing control pulses that are essentially coincident with the occurrence of ignition representative signals on line 63. These timing pulses are supplied over line 69 through integrating amplifier 105 and automatic tachometer ranging circuit 107 to a revolution per minute meter 109, which indicates the RPMs of the engine under test.

The RPM meter 109 is a dual range meter. The first range is from 0-1200 RPM. The second range is from 0-5000 RPM. The automatic tachometer ranging circuit 107 automatically switches from the low (0-1200) range to the high (0-5000) range when the engine revolutions exceed 1200 RPM. Ranging circuit 107 essentially comprises a comparator that compares the signal received from the integrator 105 with a voltage reference that represents 1200 RPM. If the integrator output signal exceeds the reference, the comparator will cause a resistance to switch into the meter circuit to convert it to a 0-5000 RPM movement. In addition, light 110 will be lit to show that the meter is in its high range. The ranging circuit 107 also generates a signal on line 70 to deactivate single sensor trigger 45 (FIG. 1A).

The secondary probe 31 picks up the high voltage ignition firing signals on the secondary of the coil and supplies considerable attentuated versions of these signals over cable 71 to a secondary trigger circuit 57 which is identical in construction to the primary trigger circuit 55. The secondary trigger circuit 57 also utilizes a comparator and one-shot multivibrator. The comparator provides an output pulse whenever its input signal on line 71 exceeds a reference voltage provided at reference terminal 56. This output triggers a non-retriggerable one-shot multivibrator to generate a short timing control pulse. These short timing control pulses are supplied over line 75 as the second input of the OR gate in trigger selector circuit 51.

If the primary and secondary probes 29 and 31, respectively, are connected to the ignition coil, timing signals will be generated on line 67 and 75 approximately in coincidence. Trigger selector circuit 51 will respond to the first timing pulse to appear at its input, whether it be a pulse on line 67 or a pulse on line 75, and generate a timing control signal on line 69 in response thereto. The OR gate of trigger selector circuit 51 will generate a pulse each time it receives a pulse at either one of its input leads 67 or 75, and trigger the one-shot multivibrator which will not be retriggered by a subsequently occurring pulse until after it times out and is reset.

When only one, either the primary or secondary probe, is connected, timing pulses are provided over only one of the input leads 67 or 75 to the trigger selector circuit 51. The OR gate therein will pass this pulse to the one-shot multivibrator which will trigger and generate the timing control pulse. Consequently, the output of trigger selector circuit 51 on line 69 is a series of timing control pulses in coincidence with the input pulses received. It, thus, can be seen that the RPM meter 109 will register revolutions per minute of the engine under test when the primary and secondary probes are connected. This eliminates a need for a selector switch to manually set the analyzing apparatus to respond either to primary or secondary generated signals.

The secondary signals on line 71 are also supplied to an amplifier 59 which amplifies these signals and supplies them over line 73 to contact 141 of selector switch 121. These signals will be supplied by selector switch 121 through variable resistor 123 to vertical amplifier 119, which in turn supplies the signals to the deflection coils 117 of the cathode ray tube display device. The amplitude of the signal display is adjusted by variable resistor 123. By setting the selector switch 121 (FIG. 1B) either the primary ignition signals from probe 29 or the secondary ignition signals from probe 31 are displayed on the CRT screen.

In order to insure that the primary trigger circuit 55 and the secondary trigger circuit 57 are not triggered erroneously by the signals at their input leads 63 and 71, respectively, a blanking or disabling signal is supplied to them over line 79 by comparator circuit 49. The blanking signal on line 79 is essentially supplied to the one-shot multivibrator located in each of the primary and secondary trigger circuits 55 and 57, and prevents the two one-shots from being triggered for as long as the blanking signal is present.

Comparator circuit 49 generates a blanking signal on line 79 for a duration that is determined by the level of the input signal supplied to it on line 77 as compared to a reference voltage level supplied to it at terminal 48. Whenever the voltage level of the signal on line 77 exceeds the voltage level of the reference signal at terminal 48, comparator 49 will generate an output signal on line 79, and continue to do so until the level on line 77 drops below that of the level on terminal 48. The signal on line 77 is a ramp voltage generated by a frequency responsive ramp generator 47.

The output signal on line 77 of the ramp generator 47 has a constant maximum amplitude. However, the slope of the ramp signal varies depending upon the frequency of the timing control signals supplied to it over line 69 by the trigger selector circuit 51. If a more complete description of the structure of a type of frequency response ramp generator that can be used for ramp generator 47 is desired, such a description can be found in U.S. Pat. No. 3,650,149 and U.S. Pat. No. 3,583,217, which are both assigned to the same assignee as is the present application.

The duration of the blanking signals on line 79 supplied to the primary and secondary triggers 55 and 57 respectively, therefore, is controlled by the slope of the ramp signal on line 77 supplied to the comparator circuit 49. Thus, it can be seen that the higher the RPM of the engine, the higher the frequency of the ignition signals received by trigger selector 51, the higher the frequency of the timing control signals on line 69 to the frequency response ramp generator 47, the steeper the slope of its ramp signal on line 77, and the shorter the duration of the blanking signal on line 79. The converse is also true.

The frequency responsive ramp generator 47 also supplies the same ramp signal over line 81 to a sweep timing circuit 43 and timing light control circuit 39. The sweep timing circuit 143 is enabled over line 97 by applying a ground signal thereto through selector switch 121 by setting wiper arm 157 on terminal 147. Sweep timing circuit 43 is essentially a comparator that generates a reset pulse on line 99 to the horizontal sweep ramp generator 113 whenever the input ramp signal on line 81 exceeds the reference voltage. This reset pulse is also supplied to a one-shot multivibrator internal to the sweep timing circuit 43 which in turn generates a clocking signal on line 85 to self-starting ring counter 37 and parade trigger circuit 44.

The timing signals supplied to ring counter 37 over line 85 from the sweep timing circuit 43 causes the ring counter to generate signals at its output stage lines 86 each time it is stepped by an input pulse on line 85. The purpose of the ring counter 37 as is more specifically described in U.S. Pat. No. 3,650,149, is to indicate which particular cylinder has fired by the signal levels present at the stage output lines 86 of the ring counter. The ring counter 37 contains as many stages as there are cylinders in the internal combustion engine. These signals are used to generate ignition blanking signals in the manner fully described in U.S. Pat. No. 3,650,149.

The ring counter generates a clocking signal at its output line 46 to timing light control circuit 39 and parade trigger gate 44 each time its first stage generates a pulse. Timing light control circuit 39 provides either basic timing signals on firing of the number one plug or advance/retard timing signals, to the timing light driver circuit 41. The parade trigger circuit is basically an AND gate that receives the clocking signal from line 85 and the first stage signal of the ring counter 37 and generates an output pulse on line 95 when there is coincidence. This output pulse is used to reset both the staircase generator 111 and the sweep ramp generator 113.

When the number 1 cylinder probe 27 is connected to the cylinder that is number 1 in the firing order of the particular engine under test, a pulse will be generated each time that cylinder experiences ignition. This signal is conditioned in pulse conditioning circuit 35 and supplied over line 83 to ring counter 37, causing ring counter 37 to be reset each time that the number one cylinder fires. As a result, the output signal on line 46 indicates the firing of the number on cylinder. If timing control circuit 39 is in the basic timing mode as determined by a selector switch (not shown), it will trigger the timing light driver circuit 41 by the signal on line 89 each time the number one cylinder fires. Drive circuit 41 will in turn light the timing light 61. If timing control circuit 39 is in the advance/retard mode, as determined by a selector switch (not shown), adjusting a knob 62 on the timing light 61 connected to a variable resistor will cause the timing light control circuit 39 to generate triggering signals on line 89 that are advanced or retarded from the occurrence of the pulse on line 47. In the advance/retard mode, the signals on line 89 are generated by a comparator which receives a ramp signal on line 81 as one input and a variable voltage on line 102 as the other input. The value of the variable voltage is determined by the adjustment of the knob 62.

Timing light driver 41 is essentially an SCR switch, driven by the signals on line 89 and line 91, and a power supply. The SCR switch connects the power supply to the timing light 61. The timing light 61 is fired below 1200 RPM even though the number one cylinder probe is not connected because of the control signals received by the timing light driver circuit 41 on line 91 from single sensor trigger 45. Single sensor trigger circuit 45 is enabled by a ground on line 93 whenever selector switch 121 is set so that wiper 157 contacts terminal 149. With only the secondary probe 31 connected to the engine, the single sensor circuit will receive the timing control signals on line 69 that represent cylinder ignition. These signals, one for each cylinder ignition, is supplied to the timing light driver 41 to cause it to turn on the timing light 61. When the engine RPM exceeds 1200 as determined by the ranging circuit 107, it generates a signal on line 70 that disable the single sensor trigger 45. This is done so that the timing light 61 is not overdriven because it is being ignited for each cylinder ignition instead of for each number one cylinder ignition, as is the prior art practice.

With only the secondary probe 31 connected to the ignition coil of the engine under test, the following tests can be performed on the engine by merely flicking the selector switch 121 to various positions. As already noted, once the secondary probe 31 is connected the RPM meter 109 immediately registers the revolutions per minute of the engine under test. The selector switch must be moved to the secondary test position; wiper 151 is connected to terminal 131; wiper 153 is connected to terminal 135; wiper 155 is connected to terminal 141; and wiper 157 is connected to terminal 149. All the wipers are ganged together. With the selector switch in this position, the timing light 61 will provide timing up to 1200 RPM. The RPM meter 109 will provide the revolutions per minute of the engine. The cathode ray tube will display a superimposed pattern of the engine ignition signals being generated at the secondary pickup probe 31. That is, separate traces, one for each cylinder of the engine, are displayed in a superimposed manner on the CRT permitting the operator to view the characteristics of all cylinders simultaneously and compare them.

If it is desired to vertically offset each of the individual cylinder firings, the staircase generator 111 is utilized simply by setting selector switch 121 so that wiper 151 contacts terminal 131; wiper 153 contacts terminal 137; wiper 155 contacts terminal 143; and wiper 157 contacts terminal 147. This position of selector switch 121 essentially provides the output of staircase generator 111 to vertical amplifier 119, causing each of the individual cylinder firings to be displayed on the screen displaced along the vertical axis. This is commonly referred to as a "stacked display".

If it is desired to display the individual cylinder firings displaced along the horizontal axis is what is commonly termed a "parade pattern", the selector switch 121 is switched so that wiper 151 is in contact with terminal 141, and wiper 157 is in contact with terminal 145. With the selector switch set in this position, the individual cylinder ignitions will be displayed along the horizontal displaced from each other.

Terminal 143 of selector switch 121 is used if it is desired to vary the voltage maximum displayed on the CRT screen. In the preferred embodiment wiper 155 contacts terminal 141 when a 40 kilovolt parade is desired, and it contacts terminal 143, when a 20 kilovolt parade is desired.

The CRT display circuits such a sweep ramp generator 113, staircase generator 111, and horizontal and vertical amplifier circuits, etc. are well known in the art. If further description of these circuits is desired, reference may be had to U.S. Pat. No. 3,650,149 or other CRT display engine analyzer systems.

Figure 2:
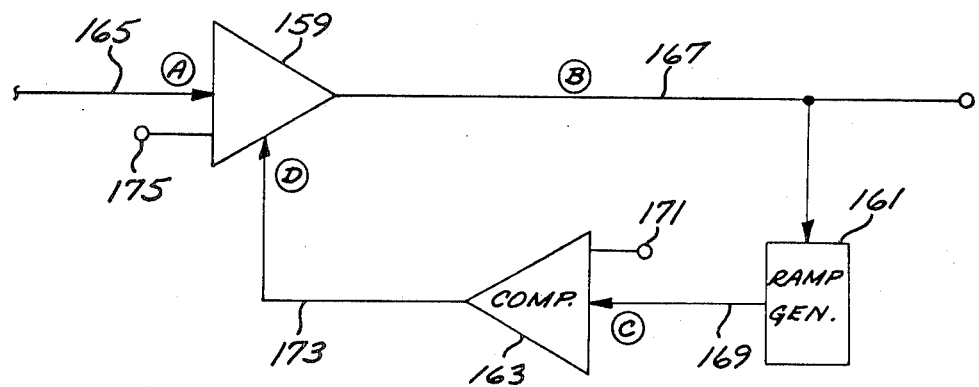
FIG. 2 is a block diagram of a frequency responsive noise rejection circuit used in the analyzer of the present invention.
Figure 3:
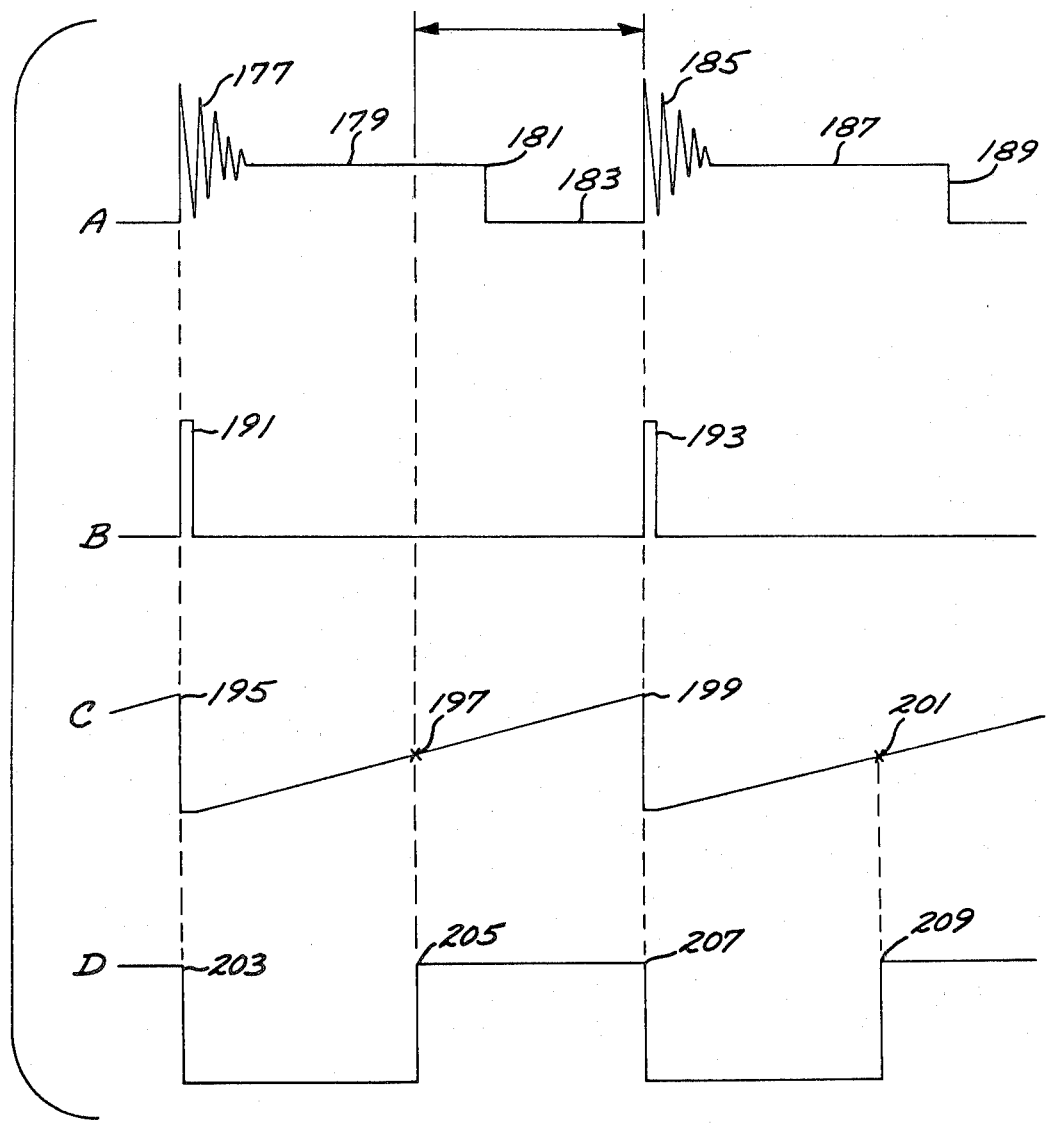
FIG. 3 illustrates the waveforms at various points of the frequency responsive noise rejection circuit of FIG. 3.

The frequency response noise rejection circuitry of the present invention, as utilized with the primary probe 29 and secondary probe 31 of the analyzer in FIG. 1A, is shown as it would be used in general application in FIG. 2. The basic components of the circuit are a comparator and one-shot multivibrator combination 159, generating ignition indicating timing control signals; and a ramp generator 161 and comparator 163 in a feedback loop generating blanking signals to the ignition indicating control signal circuit 159. Referring also to the waveforms of FIG. 3, the purpose of the circuit of FIG. 2 is to receive ignition signals from the ignition coil of the internal combustion engine, of the type shown in signal train A, and generate in response thereto, timing control signals as shown in signal train B.

Waveform A illustrates, in a representaive manner, the changing voltages that occur at the secondary of an ignition coil of an internal combustion engine. At point 181 of the signal, the points of the engine are closed and battery alternator current flows through the primary windings of the ignition coil, building up a magnetic field. This continues for the period indicated by line 83 until the points open again. As the points open, the coil begins to discharge causing a surge at the secondary which ionizes the rotors and plug gap. Immediately following ionization, a plug gap is jumped. This action is evidenced by the portion 185 of the signal. During the arcing phase, the energy in the coil is being dissipated. Arcing will continue until the voltage in the coil drops below a level that will support the arc in the plug gap. Even after arcing stops, the coil continues to dissipate its energy as indicated at 187 so that the entire energy remaining in the coil is dissipated before the next dwell period begins at 189. At that time, the entire process is repeated.

Signal train A, including the ignition pulses 177 and 185, the dissipating portions 179, 187 and charging portion 183, is supplied as an input on line 165 to ignition timing control signal generating circuit 159. In response thereto, circuit 159 supplies the ignition timing control signals 191 and 193 on line 167. The timing control signal generating circuit 159 receives a reference voltage at its other input at terminal 175 and a blanking signal on line 173.

The ignition timing control signal generating circuit 159 preferably comprises a comparator (not shown) having its output coupled to the input of a one-shot multivibrator (not shown). The comparator receives the signals on line 165 and 175 and generates an output signal whenever the ignition signals on line 165 exceed in amplitude the voltage reference signal supplied on line 175. The output of the comparator is fed to the one-shot multivibrator, causing it to trigger and generate a short pulse such as 191 and 193 of signal train B. The multivibrator of the timing control circuit 159 is prevented from generating a pulse more than once during one firing cycle by the disabling signal supplied to it over line 173. This disabling signal takes the general configuration as shown in signal train D. It is during the periods that the signal on line 173 is at its low level, such as between points 203 and 205, and 207 and 209, that the one-shot multivibrator is held in a disabled position and not permitted to trigger. During the times when the signal is at its high level, such as between points 205 and 207, the multivibrator is enabled and will generate an output pulse in response to an input signal from the comparator. The width of an enabling pulse, that is, the distance between points 205 and 207 for example, and the width of the disabling period, that it the distance between points 203 and 205, for example, varies depending upon the frequency of the ignition timing control pulses 191 and 193 received by frequency responsive ramp generator 161.

If a complete explanation of the structure and function of this generator is required, reference should be made to U.S. Pat. No. 3,650,149. In response to the ignition timing control signals 191 and 193, the ramp generator 161 generates a ramp signal starting with the receipt of an ignition control pulse, such as 191, until the receipt of the next signal control pulse, such as 193. The amplitude of the ramp voltage, such as at points 195 and 199, will not vary. However, the slope of the ramp will increase as the frequency of the ignition control pulses 191 and 193 increases. Thus, it can be seen that as the pulses 191 and 193 come close together, the slope of the ramp signal from ramp generator 161 will increase and vice versa.

The ramp output signal of generator 161 is supplied over line 169 to a comparator amplifier 163. The other input of comparator amplifier 163 is a reference voltage connected to terminal 171. Whenever the ramp signal exceeds the predetermined reference voltage, for example at point 197 or point 201 of the ramp signal of signal train C, the comparator 163 begins to generate its enabling signal and continues to do so until the output of the ramp generator drips below this reference voltage at the occurrence of the next ignition timing control pulse, such as 193. In this manner, the circuit of FIG. 2 generates one ignition timing control pulse per ignition cycle and rejects all other spurious voltages occurring, thereby preventing mistriggering of the analyzing apparatus in which it is used.

Figure 4:
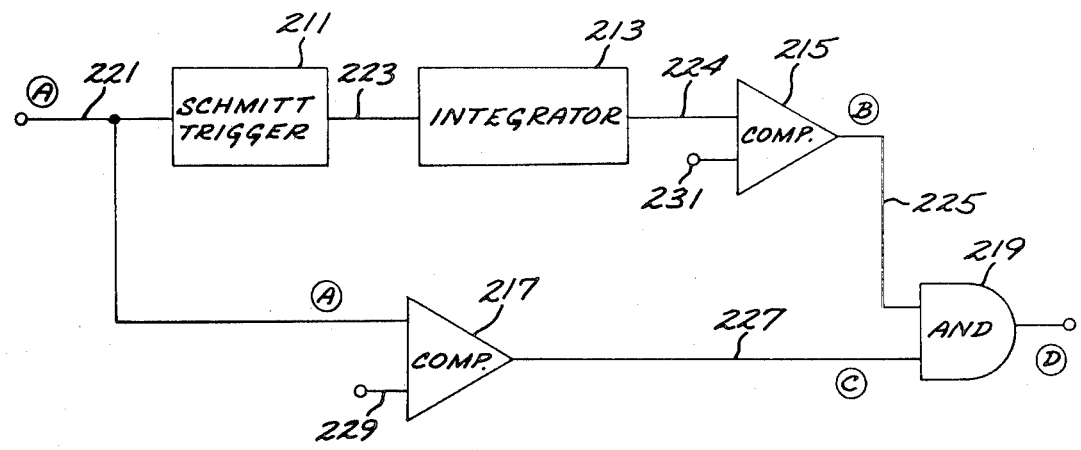
FIG. 4 is a block diagram of a frequency responsive noise rejection circuit, according to the present invention, in an alternate preferred embodiment.
Figure 5:
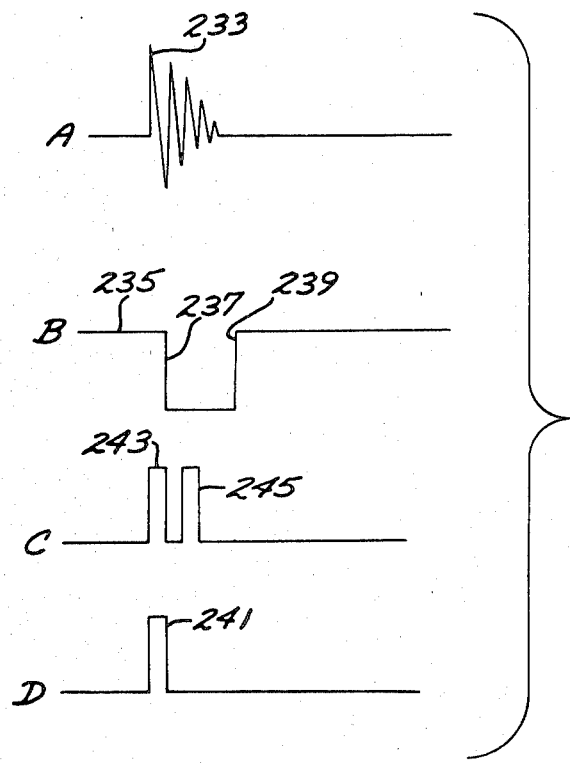
FIG. 5 is a diagram illustrating the waveforms taken at various points of the circuit of FIG. 4.

Refer now to FIGS. 4 and 5 which shows an alternate preferred embodiment of a frequency responsive noise rejection circuit according to the present invention. It is seen that an AND gate 219 receives pulse representations 243, 245 on line 227 as a result of an ignition signal 233 supplied to the circuit of FIG. 4 on line 221. The other input to AND gate 219 on line 227 causes the second spurious pulse 245 to be blocked so that the output of AND gate 219 is the single ignition timing control signal 241.

A comparator 217 receives the ignition signal 233 at its first input on line 221 and generates output pulses (signal train C) on line 227 to AND gate 219 whenever the input level exceeds the reference voltage level supplied to comparator 217 at terminal 229. As can be seen from pulse signal train C, this can occur more than once per ignition cycle. The blanking signal supplied to the AND gate 219 on line 225 is generated by comparator 215 which generates an output (signal train B) in response to the signal received by it on line 224, as compared to the reference voltage connected to terminal 231.

The signal generated on line 224 is developed from the ignition signal 233 by schmitt trigger 211 and integrator 213. The schmitt trigger generates a plurality of short pulses as a result of the ignition signal 233 for as long as its threshold is exceeded. The integrator 213 integrates these signals and provides an analog voltage having a certain minimum level on line 224 to the comparator 215.

The comparator 215 will generate a high level 235 (signal train B) as long as the signal level on line 224 is less than the reference voltage at 231. If the signal level on line 224 exceeds the reference voltage at 231, or when an ignition signal is present, the comparator output signal drops low 237 and stays low until 239 when the level on line 224 is again less than the reference at 231.

Figure 6:
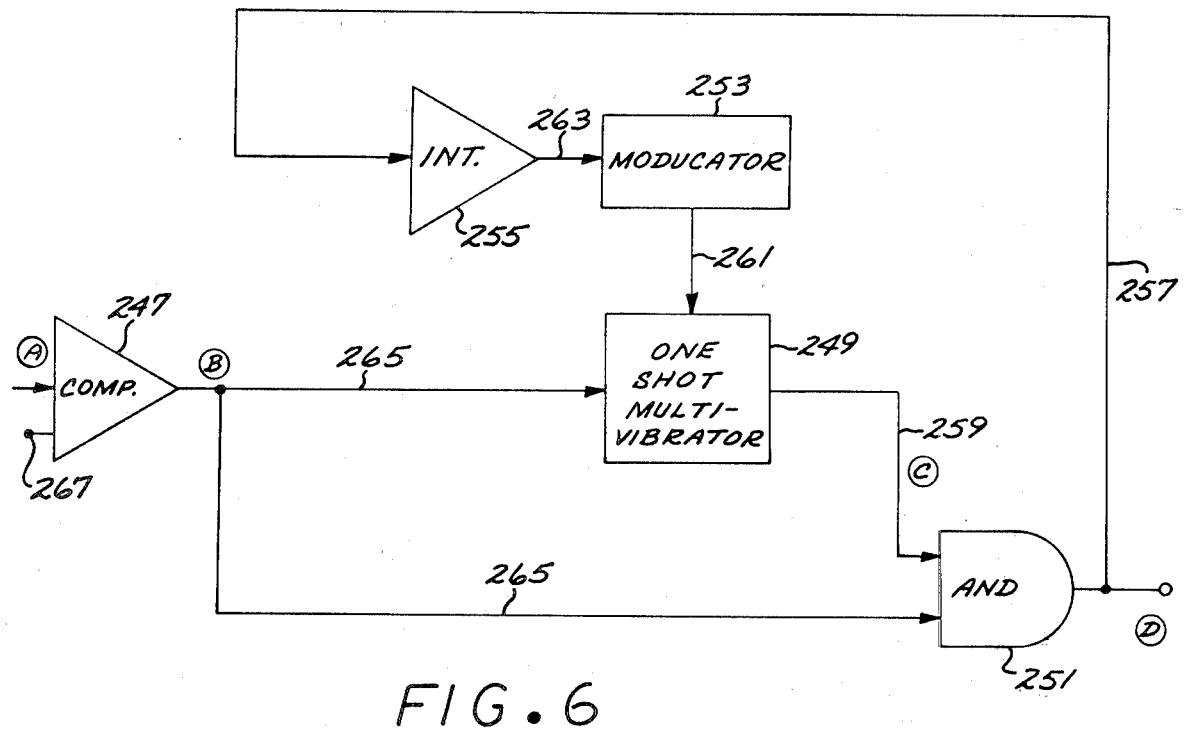
FIG. 6 is a block diagram of a frequency responsive noise rejection circuit, according to the present invention, in another alternate preferred embodiment.
Figure 7:
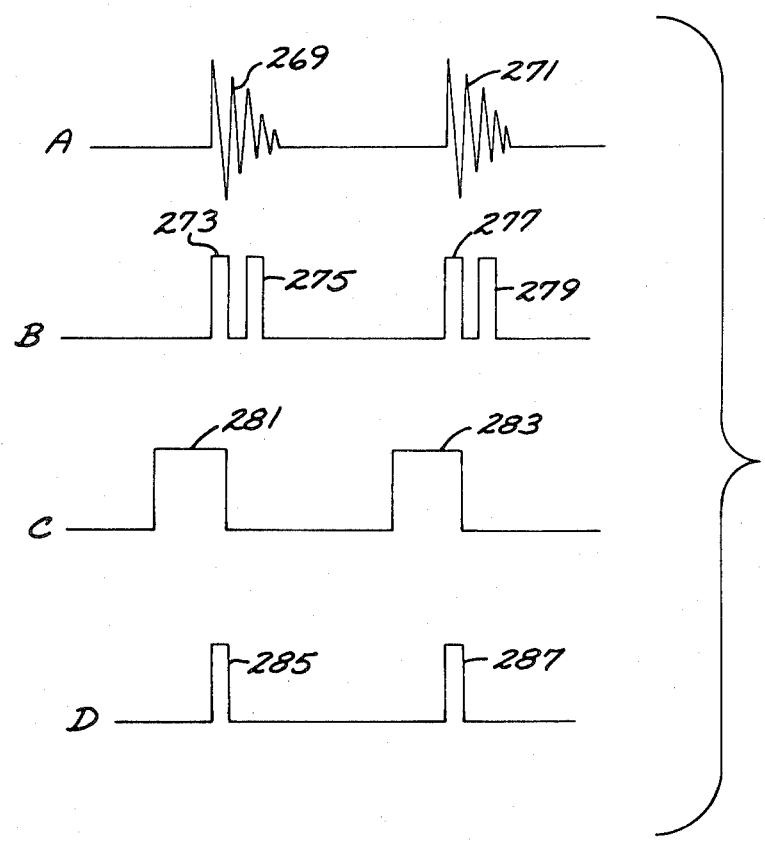
FIG. 7 is a diagram illustrating the waveforms at various points of the circuit of FIG. 6.

Refer now to FIGS. 6 and 7 wherein another alternate preferred embodiment of a frequency responsive noise rejecting circuit is illustrated. The AND gate 251 generates ignition timing indicating signals 285, 287 (signal train D) at its output line 257 in response to the reception of signals on line 265 (signal train B) on line 259 (signal train C). The signals on line 265 represent the output of comparator amplifier 247 responding to an input of ignition signals 269, 271 (signal train A), and a reference voltage level at terminal 267. Whenever the input signals 269, 271 exceed the voltage level at 267, the comparator 247 generates an output signal such as 273, 275, 277, 279. As can be seen, more than one pulse is generated during each firing cycle. Pulses 275 and 279 are undesired signals than may cause mistriggering of the analyzing equipment within which the circuit is utilized.

To block out the undesired pulses, a blanking pulse on line 259 (signal train C) is generated by a one-shot multivibrator 241. A non-retriggerable one-shot multivibrator 249 responds to the signal pulses at its input and specifically, the trailing edge of such signal pulses to generate an output signal that varies in duration depending upon the RC constant of the multivibrator. Thus, it can be seen from signal train C the normal or reset output of multivibrator 249 is a high which enables the AND gate 251. The multivibrator is triggered by the trailing edge of the first pulse 273 causing it to generate a low for a period of time determined by its RC network. Because it is non-retriggerable, the subsequent pulse 275 has no effect on it. When the multivibrator is generating a low signal to AND gate 251, the AND gate is unable to generate signals at its output. The time gap between pulses 281 and 283 will vary depending upon the frequency of the ignition indicating signals 285, 827, which are supplied by AND gate 251 over line 257 to an integrator 255, and then over line 263 to a transistor-activated resistance network 253 that causes the RC constant of the one-shot multivibrator 249 to vary according to the frequency of the pulses received by the integrator 255. The higher the frequency, the shorter the distance between the pulses 285, 287, the smaller the RC time constant created by the modulator 253. Since the AND gate 251 is enabled only when the signal on line 259 is at a high, it can be seen that because the multivibrator becomes activated and consequently generates a low at the trailing edge of the first-occurring pulse, no additional subsequent occurring spurious ignition indicating signals can be generated at the output of AND gate 251. No additional pulse can be generated at the output of AND gate 251 until one-shot multivibrator 249 again times out and again generates a high at its output.

Figure 8:
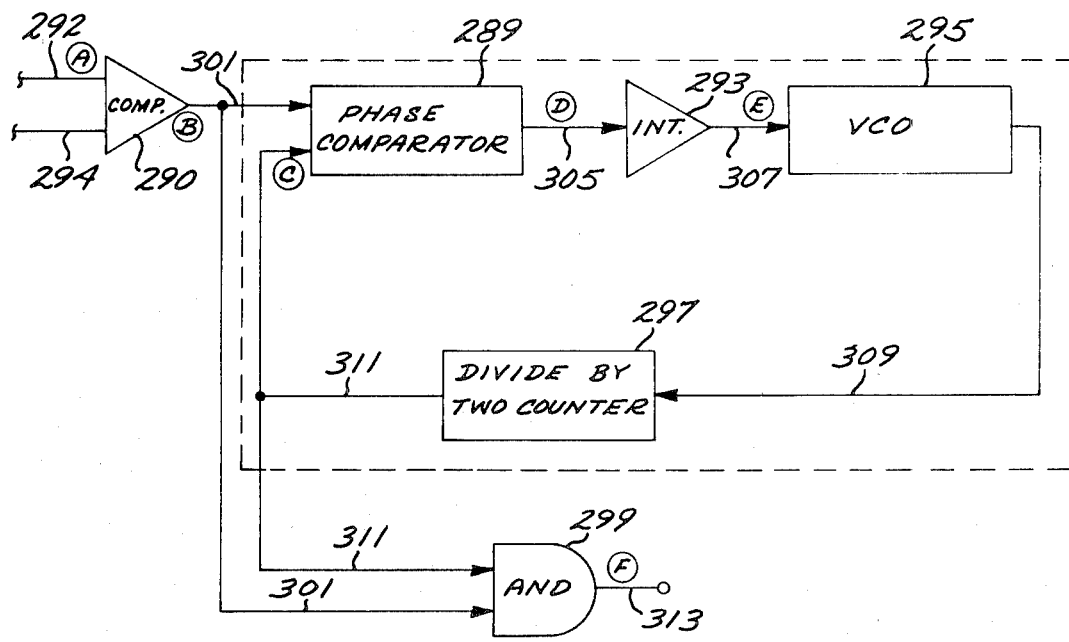
FIG. 8 is a block diagram of a frequency responsive noise rejection circuit, according to the present invention, in yet another preferred embodiment.
Figure 9:
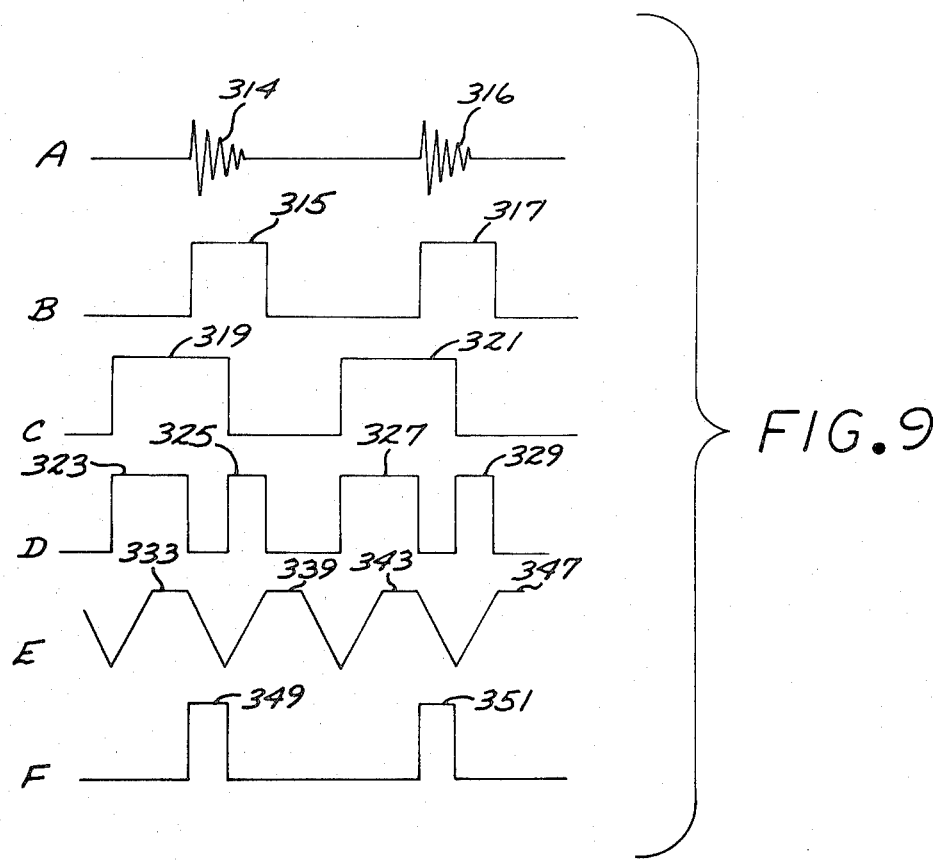
FIG. 9 is a diagram illustrating the waveforms taken at various points of the circuit of FIG. 8.

FIGS. 8 and 9 illustrate yet another alternate preferred embodiment of a frequency responsive noise rejection circuit used in an internal combustion engine analyzer. AND gate 299, provides ignition indicating control signals 349, 251 (signal train F) in response to signal inputs at its leads 311 and 301 (signal train C and B, respectively). The signals on line 301 are supplied to AND gate 299 by a comparator amplifier 290 which receives at its input the ignition signals 314, 316 (signal train A), and receives at its other input 294 a voltage reference signal. Whenever the ignition signals received on line 292 exceed the amplitude of the voltage reference signal, comparator amplifier 290 generates an output on line 301 as illustrated by signals 315 and 317 (signal train B).

The other input to AND gate 299 on line 311 is supplied to it by a divide by two counter 297. This other input (signal train C) provides the blanking signals, wherein pulses 319 and 321 are enabling signals and the distances between these enabling signals represent the period that the AND gate 299 is disabled or blanked. These blanking signals vary in duration with respect to the frequency of the signals at the output of the comparator 301.

Both signal train B and signal train C are supplied to a phase comparator network 289 which consists basically of an Exclusive OR circuit which generates at its output signals 323, 325, 327 and 329 (signal train D) that indicate the periods of time that the signals of signal trains B and C are out of phase. Signal train D is supplied to an integrator 293 which provides an integrated output signal on line 307 (signal train E) to a voltage-controlled oscillator 295. Oscillator 295 has its frequency controlled by the input signal (signal train E) supplied to it. Thus, it can be seen that the more out of phase the signals of signal trains B and C are, the greater the control signal supplied to the voltage controlled oscillator 295 over line 307 and the greater the frequency adjustment at the output of the voltage controlled oscillator 295. As a result, the AND gate 299 generates signals 349, 351 (signal train F), only when the signals on signal train C overlap the signals on signal train B.

What has been described is an engine analyzer that need be connected to the engine by only one sensor lead, which provides for automatic triggering from either the primary or secondary sensors of the ignition coil, and utilizes a noise rejection triggering circuit that will respond equally well without mistriggering to standard or electronic ignition systems. It should be understood, however, that the foregoing disclosure relates only to preferred embodiments of the invention, and that modifications may be made therein without departing from the spirit and scope of the invention as set forth in the appended claims.

What is claimed is:

1. In an improved apparatus for analyzing the operation of a multiple cylinder internal combustion engine wherein plug firings to obtain cylinder ignition are displayed on a cathode ray tube and engine timing is determined by driving a timing light in synchronism with cylinder ignition, the improvement comprising:

a first sensor means adapted for connection to the primary winding of the engine's ignition coil for sensing the plug firings of all the cylinders in said engine;

a second sensor means adapted for connection to the secondary winding of the engine ignition coil for sensing the plug firings of all the cylinders in said engine;

a first means responsive to said first sensor means for generating timing control signals representative of cylinder ignition;

a second means responsive to said second sensor means for generating timing control signals representative of cylinder ignition; and, selector means adapted for receiving the timing control signals from said first and second timing control signal generating means and generating timing control signals in response to the first in time control signals received from said first and second timing control signal generating means.

2. The improved analyzing apparatus of claim 1 further comprising means responsive to said selector means for inhibiting said first and second control signal generating means from generating a timing control signal for a duration dependant on the frequency of the control signals from said selector means.

3. The improved analyzing apparatus of claim 2 further comprising tachometer means responsive to said selector means for indicating engine revolutions per minute.

4. The improved analyzing apparatus of claim 2 further comprising timing light driver means responsive to said selector means for activating said timing light each time a plug for a cylinder fires.

5. The improved analyzing apparatus of claim 2 further comprising continuous counting ring counter means, having one stage for each cylinder in the engine under test, for generating cylinder ignition timing control signals to drive a display of cylinder ignition signals.

* * * * *